June 12, 1923.
A. MOORE
DISK HARROW
Filed March 6, 1922
1,458,841
2 Sheets-Sheet 1
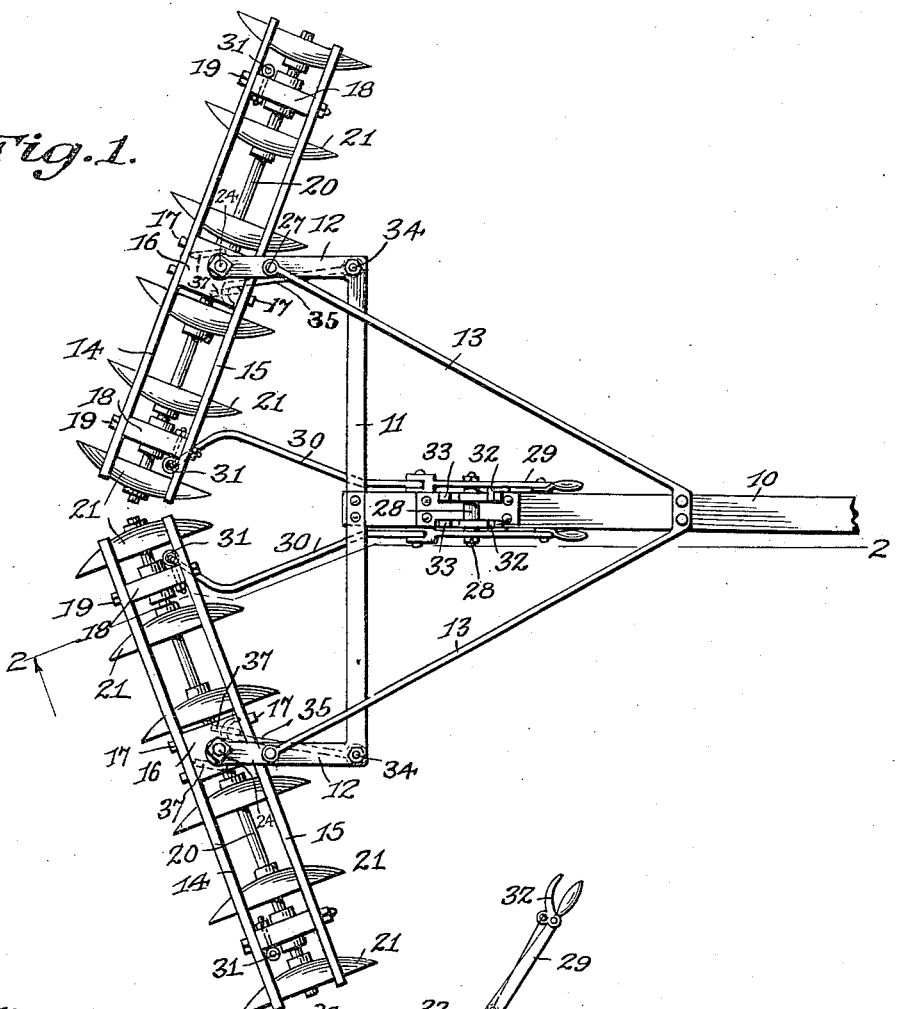
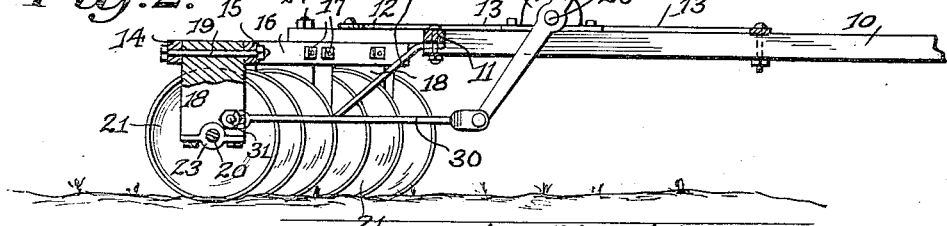
Austin Moore, INVENTOR.
BY Geo. P. Kimmel
ATTORNEY.

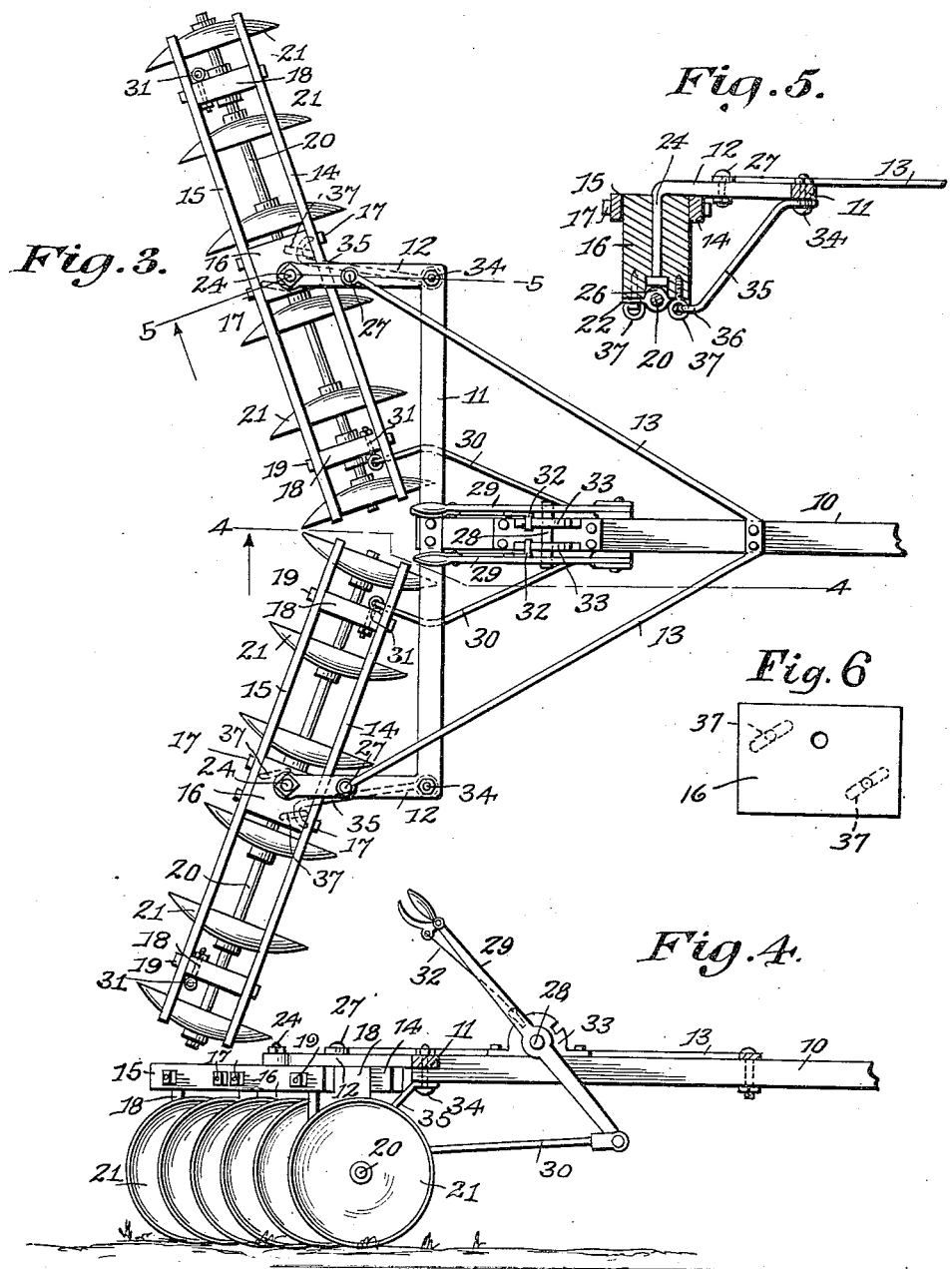

Patented June 12, 1923.

1,458,841

UNITED STATES PATENT OFFICE.

AUSTIN MOORE, OF MOUNT PLEASANT, IOWA.

DISK HARROW.

Application filed March 6, 1922. Serial No. 541,456.

*To all whom it may concern:*

Be it known that I, AUSTIN MOORE, a citizen of the United States, residing at Mount Pleasant, in the county of Henry and State of Iowa, have invented certain new and useful Improvements in Disk Harrows, of which the following is a specification.

This invention relates to harrows, more particularly of the disk type, and has for one of its objects to simplify and improve the construction and increase the efficiency and utility of devices of this character.

The improved device includes coacting harrow elements mounted to swing independently and adapted to be locked in adjusted position, to enable the earth engaging devices to be operated reversely and thus level the ground and eliminate ridges and other uneven parts of the soil, leaving the surface soil uniform throughout and free from uneven portions.

With these and other objects in view the invention consists in certain novel features of construction as hereinafter shown and described and then specifically pointed out in the claims, and in the drawings illustrative of the preferred embodiment of the invention:—

Figure 1, is a plan view of the improved device with the parts in one of their two positions.

Fig. 2, is a section on the line 2—2 of Fig. 1.

Fig. 3, is a plan view with the parts in reversed position to the disclosure in Fig. 1.

Fig. 4, is a section on the line 4—4 of Fig. 3.

Fig. 5, is an enlarged sectional detail on the line 5—5 of Fig. 3 and illustrating a modification in the construction.

Fig. 6, is an enlarged view of one of the coupling blocks removed.

The improved device includes a tongue or stock member 10 to which the draft animals, tractor, or other motive power is coupled, and provided with a transverse member 11 at the rear end, the latter having rearwardly directed extensions or arms 12 at its ends, and braced as at 13 from the stock 10. The harrow elements are alike and a description of one will suffice for both.

Each harrow element comprises spaced rails or beams 14—15 coupled centrally thereof by a block 16 which is bolted or otherwise rigidly attached to the rails by bolts 17.

A hanger 18 is bolted or otherwise secured as shown at 19 between the members 14 and 15 near each end, the hangers and the block depending below the beams and carrying a shaft 20, which supports a plurality of harrow disks 21. Each of the blocks 16 carries a bearing 22 at its lower end to receive the shaft 20, while each of the hangers 18 carries a similar bearing, one of which is shown at 23 in Fig. 2.

Each of the blocks 16 is provided with a vertical pivot bolt 24, and represented more fully in Fig. 5, the latter having a head 25 at the lower end received in a socket or seat 26 in the lower face of the block.

In Figs. 1, 2, 3, and 4 the pivot pins 24 extend above the upper faces of the blocks and are engaged by the parts 12 of the supporting frame, the latter secured in position by clamp nuts 27, while in Fig. 5 the members 12 and 24 are integral, or with the portions 24 bent downwardly from the part 12. Either structures may be employed, as preferred. By this means the harrow elements are swingingly coupled independently relatively to the supporting frame work.

Pivoted at 28 to the tongue or stock member 10 are operating levers 29, one for each of the harrow elements and coupled respectively by rods 30 alternately to the harrow elements, for instance by eye bolts as at 31 in the outer hangers 18, as hereafter explained.

The levers 29 are each provided with a pawl device 32 coacting with notched segments 33 attached to the stock 10.

Pivoted at 34 to each of the portions 12 is a rod 35 having hooked ends 36 to engage an eye 37 in the members 16, to lock the harrow elements in adjusted position.

By this arrangement the harrow elements may be independently operated on their pivots 24, and reversed and locked in their adjusted positions.

When moving over the field the first time the harrow elements are set as shown is Fig. 1, the result being to produce parallel furrows or ridges corresponding in width to the spaces between the disks 21. Then by reversing the positions of the harrow elements or arranging them as shown in Fig. 3, and again moving over the field, the furrows or ridges previously formed are cut across and obliterated, leaving the ground level and free from ridges or furrows.

The improved device is simple in construction, can be manufactured in any required size and of any suitable material, but the parts will preferably be of steel as light as possible consistent with the strains to which they will be subjected.

It is obvious that ordinary spring harrow teeth or, ordinary harrow teeth may be substituted for the disks 21, but the device is more particularly adapted for disk harrows.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In a harrow, a draft tongue having rearward extensions in spaced relation, a frame formed of spaced side members and connecting blocks at the ends and intermediate the ends, said blocks having bearings at their lower ends, shafts engaging said bearings and carrying harrow disks, a pivot device connecting the rearward extension members with each of the intermediate blocks and on which said frames swing, means for swinging said frames and the shafts and harrow disks carried thereby upon the pivots, and means for locking said frames and their attachments in adjusted position.

2. In a harrow, a draft tongue having rearward extensions in spaced relation, a frame including block devices depending from said frames at the ends and intermediate the ends, said blocks having bearings at their lower ends, shafts engaging said bearings and carrying harrow disks, pivot devices connecting the rearward extension members with the intermediate blocks and on which said frames swing, means for swinging said frames and the harrow disks carried thereby upon the pivots, and means for locking the frames and their attachments in adjusted position.

In testimony whereof, I affix my signature hereto.

AUSTIN MOORE.